(12) United States Patent
Linder

(10) Patent No.: US 12,072,197 B2
(45) Date of Patent: Aug. 27, 2024

(54) SYSTEM AND METHOD FOR IDENTIFYING TRIP SIMILARITIES

(71) Applicant: Allstate Insurance Company, Northbrook, IL (US)

(72) Inventor: Eric M. Linder, Downers Grove, IL (US)

(73) Assignee: Allstate Insurance Company, Northbrook, IL (US)

( * ) Notice: Subject to any disclaimer, the term of this patent is extended or adjusted under 35 U.S.C. 154(b) by 185 days.

(21) Appl. No.: 17/828,654

(22) Filed: May 31, 2022

(65) Prior Publication Data

US 2023/0384104 A1 Nov. 30, 2023

(51) Int. Cl.
G01C 21/34 (2006.01)
G01C 21/32 (2006.01)
G01C 21/36 (2006.01)
G06F 16/29 (2019.01)

(52) U.S. Cl.
CPC ......... *G01C 21/3461* (2013.01); *G01C 21/32* (2013.01); *G01C 21/3469* (2013.01); *G01C 21/3605* (2013.01); *G06F 16/29* (2019.01)

(58) Field of Classification Search
None
See application file for complete search history.

(56) References Cited

U.S. PATENT DOCUMENTS

| 9,650,051 B2 | 5/2017 | Hoye et al. |
| 10,210,679 B1 | 2/2019 | Higgs et al. |
| 10,309,787 B2 | 6/2019 | Strauf et al. |
| 10,520,326 B2 * | 12/2019 | Sun ...................... G06Q 10/047 |
| 11,162,802 B2 | 11/2021 | Kreig et al. |
| 11,846,517 B2 * | 12/2023 | Snowden ........... G01C 21/3461 |
| 2013/0304515 A1 | 11/2013 | Gryan et al. |
| 2014/0330506 A1 | 11/2014 | Ng et al. |

OTHER PUBLICATIONS

International Search Report and the Written Opinion of the International Searching Authority for International Application No. PCT/US2023/023188 dated Aug. 7, 2023 (15 pages).

Mariescu-Istodor Radu Radum@Cs Uef Fi et al., "Grid-Based Method for GPS Route Analysis for Retrieval", ACM Transactions on Spatial Algorithms and Systems, ACM, 2 Penn Plaza, Suite 701 New York NY10121-0701 USA, vol. 3, No. 3, Sep. 29, 2017 (Sep. 29, 2017), pp. 1-28.

* cited by examiner

*Primary Examiner* — Todd Melton
(74) *Attorney, Agent, or Firm* — Akerman LLP

(57) ABSTRACT

Implementations include classifying vehicle trips as similar to previous trips based on location information of a vehicle received from a location device. Unique tile identifiers of the trip, each corresponding to a geographic area and the location information, may be determined and used to generate a fingerprint of the trip. The derived trip fingerprint of the trip information may be compared to stored fingerprints of one or more previously received trips to determine if the new trip is similar to one or more of the previous trips. In one instance, information or data of a new trip may be adjusted based on previous trip data. For example, aspects of the new trip or the previous trip may be updated with information or data of a previous trip if the new trip and the previous trip are similar.

21 Claims, 8 Drawing Sheets

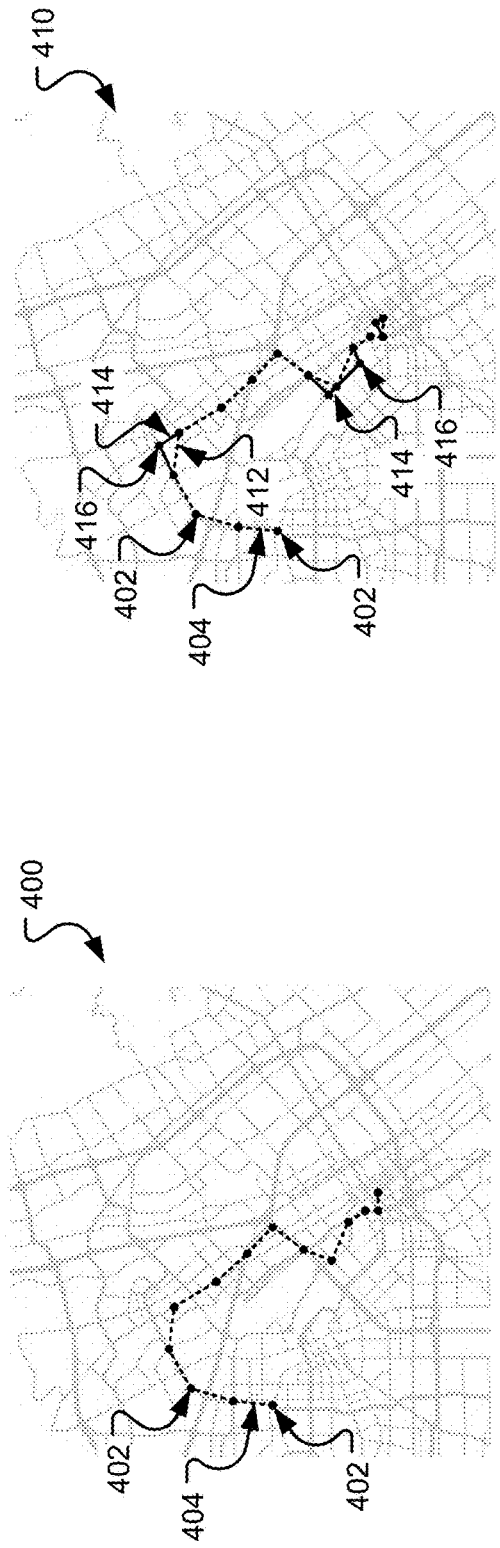
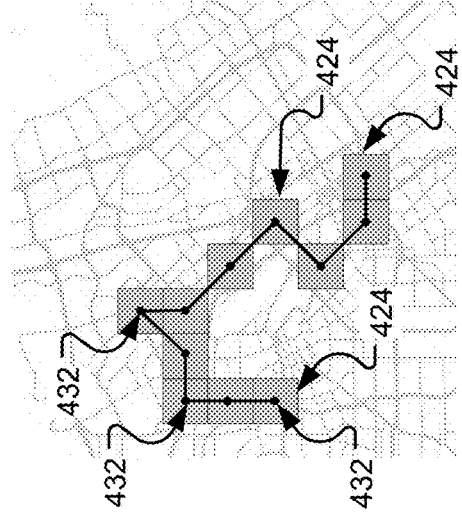
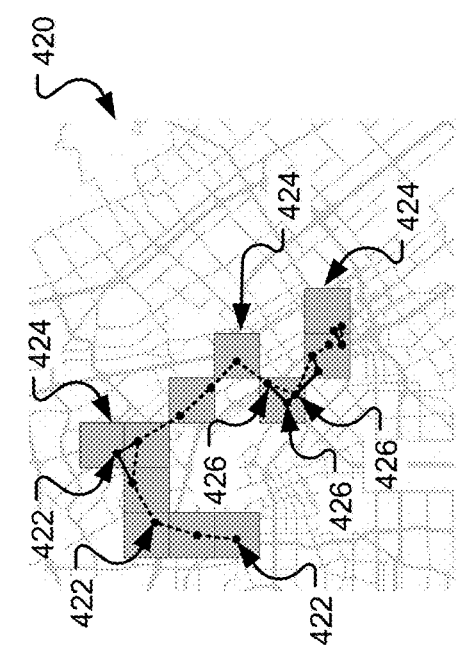
FIG. 4A
FIG. 4B
FIG. 4C
FIG. 4D

SYSTEM AND METHOD FOR IDENTIFYING TRIP SIMILARITIES

TECHNICAL FIELD

Aspects of the present disclosure generally relate to systems and methods for data processing, and more specifically for classifying telematics data to identify similarities between dusters of data corresponding to vehicle trips.

BACKGROUND

Telematics data from vehicles may be processed in a variety of ways to gain an understanding of the operation of the vehicles. For example, acceleration data, speed data, braking data, heading data, and the like obtained from a device associated with an operated vehicle may be processed to determine aspects of the vehicle operation. Such processed data may be used to monitor how safely a driver operates a vehicle and/or to estimate the wear and tear on the vehicle's systems based on how the vehicle is operated. However, the operation of a vehicle may be dependent on a type of vehicle trip, such as a long road-trip comprising mostly freeway travel versus a commute to a driver's place of business. Therefore, classifying a trip of a vehicle may aid in the processing of telematics data associated with the trip and provide additional insight into the operation of the vehicle during the trip.

It is with these observations in mind, among other, that aspects of the present disclosure were conceived.

SUMMARY

Implementations described and claimed herein address the foregoing by providing systems and methods for classifying a vehicle trip. In one implementation; a method may include the operations of obtaining, by a classification system, a plurality of geographic location points associated with the vehicle trip, the plurality of geographic location points determined by a location device, identifying, from a database of geographic tile identifiers and based on the plurality of geographic location points, a plurality of geographic tile identifiers associated with the vehicle trip, each of the plurality of geographic tile identifiers defining a geographic region, deriving, from the plurality of geographic tile identifiers, a fingerprint value for the vehicle trip, and assigning, by comparing the fingerprint value for the vehicle trip to a database of fingerprint values of previous trips, a classification label to the vehicle trip corresponding to at least one previous vehicle trip.

In one implementation in accordance with aspects of the disclosure, a system for classifying a vehicle trip is disclosed. The system may include a communication interface receiving a plurality of geographic location points associated with the vehicle trip, the plurality of geographic location points determined by a location device associated with a vehicle of the vehicle trip, a processing device, and a non-transitory computer-readable medium encoded with instructions. When the instructions are executed by the processing device, the instructions may cause the processing device to identify, from a database of geographic tile identifiers and based on the plurality of geographic location points, a plurality of geographic tile identifiers associated with the vehicle trip, each of the plurality of geographic tile identifiers defining a geographic region, derive, from the plurality of geographic tile identifiers, a fingerprint value for the vehicle trip, and assign, by comparing the fingerprint value for the vehicle trip to a database of fingerprint values of previous trips, a classification label to the vehicle trip corresponding to at least one previous vehicle trip.

In another implementation in accordance with aspects of the disclosure, a non-transitory, computer-readable medium storing instructions is disclosed that, when executed by one or more processors, cause the one or more processors to perform operations. Such operations may include obtaining, by a classification system, a plurality of geographic location points associated with the vehicle trip, the plurality of geographic location points determined by a location device, identifying, from a database of geographic tile identifiers and based on the plurality of geographic location points, a plurality of geographic tile identifiers associated with the vehicle trip, each of the plurality of geographic tile identifiers defining a geographic region, deriving, from the plurality of geographic tile identifiers, a fingerprint value for the vehicle trip, and assigning, by comparing the fingerprint value for the vehicle trip to a database of fingerprint values of previous trips, a classification label to the vehicle trip corresponding to at least one previous vehicle trip.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIGS. 4A-4D depict a series of geographic maps with a route of a trip and determined tiles corresponding to the route identified through the method of FIG. 3.

Figure 1:
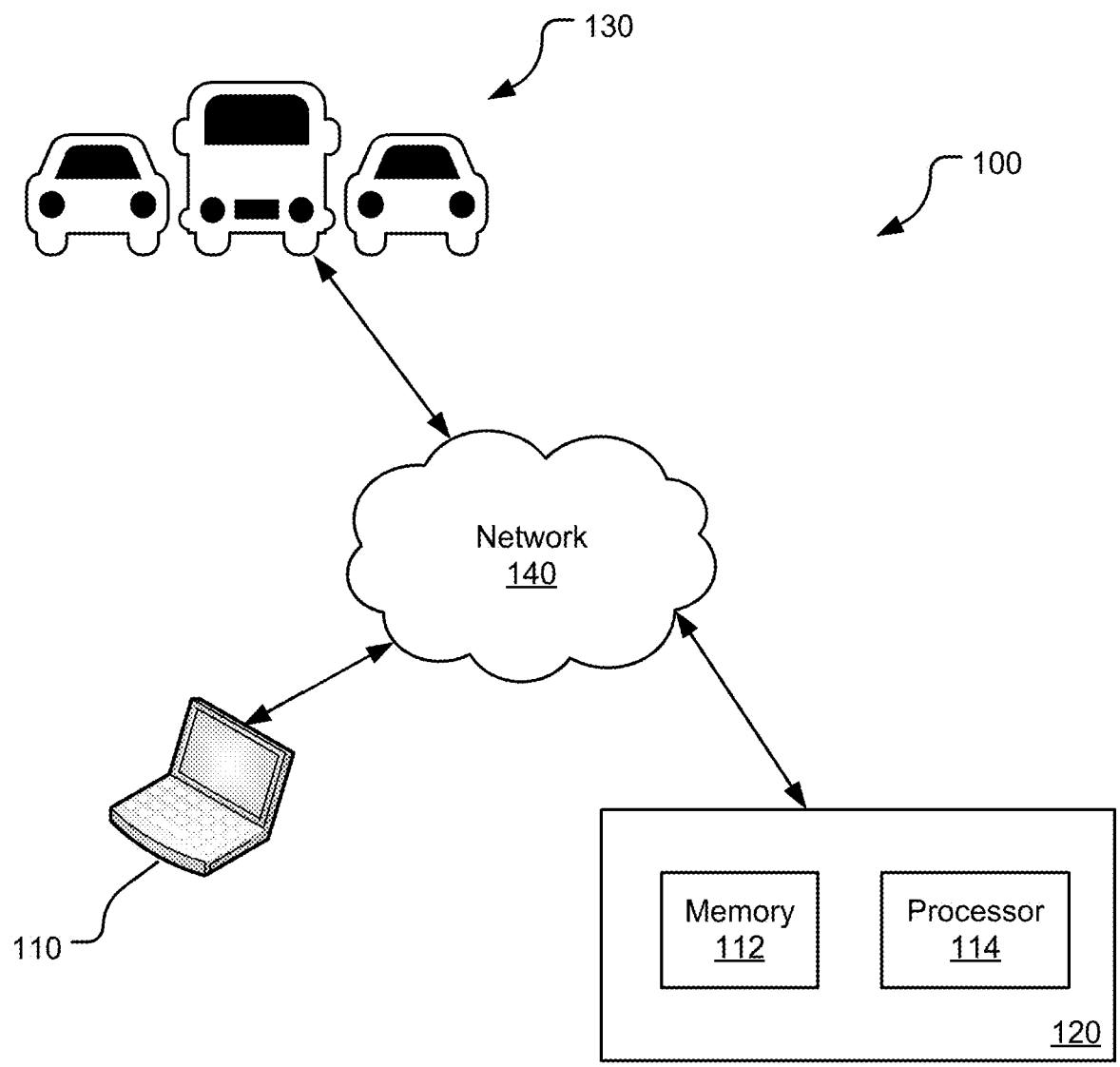
FIG. 1 illustrates an example operating environment for identifying trip similarities.

it will be apparent to one skilled in the art after review of the entirety disclosed that the steps illustrated in the figures listed above may be performed in other than the recited order, and that one or more steps illustrated in these figures may be optional.

DETAILED DESCRIPTION

Aspects described herein relate to classifying vehicle trips, particularly for classifying trips that are similar in route based on telematics data received at a processing or computing device. In particular, a location device, such as a Global Positioning System (GPS) or other locating device, may be obtain location information of a vehicle or operator of a vehicle during a trip. The location information, along with other telematics data, may be collected into a set as associated with a vehicle trip based on a determined starting point and/or ending point for the trip. The location information may then be processed to generate a fingerprint or other type of unique identifier for the trip. In one implementation, each of the location information for a received trip may be correlated to a geographic tile, each tile corresponding to a geographic region. One or more of the location information of the trip may also be adjusted or amended based on the corresponding geographic tile. In addition, each of the identified may be associated with a unique tile identifier value, either from a database of identifier values or derived from aspects of the geographic tile. The set of tile identifier values may, in some instances, be sequenced to correspond to the sequence of the location information obtained by the locating device during the vehicle trip.

The set of tile identifier values of a received trip may be processed to generate a fingerprint for a vehicle trip. In one implementation, two or more of the unique identifier values of the geographic tiles may be combined and a trip fingerprint value may be derived from the combined identifier values. For example, the combined tile identifier values may be processed through a repeatable hashing technique to generate a hashed value that may then be set as the fingerprint for the received trip. In this manner, the fingerprint of a trip is based on the location information of the trip received from the locating device. The trip fingerprint may be stored in a database of trip fingerprints, creating a history of vehicle trips for a particular vehicle or any number of vehicles. Further, the derived trip fingerprint of newly received trip information may be compared to stored fingerprints of one or more previously received trips to determine if the new trip is similar to one or more of the previous trips. If the fingerprint of the new trip matches or is similar to a previous trip, the new trip may be associated with the previous trip, such as through a combination of information of the two matching trips. In another example, the new trip information may be discarded as being duplicative of a previous trip already stored in the database.

In still another implementation, information or data of a new trip may be augmented, altered, adjusted, etc. based on previous trip data. For example, a list of tile identifier values for a new trip may be similar, but not identical, to a list of tile identifier values for a previous trip. A determination of a similarity between a new trip and a previous trip may be based on applying a distance technique, such as a Levenshtein Distance algorithm, a Longest Common Subsequence, Hamming distance algorithm, cosine distance algorithm, among others, that determines a similarity between a list of tile identifier values for the new trip to one or more list of tile identifier values of previous trips maintained in a database of tile identifier lists. Aspects of the new trip or the previous trip may be updated with information or data of the other trip when it is determined that the new trip and the previous trip are similar. For example, a missing tile identifier or missing location points may be inserted into trip data for the new trip if the new trip is similar to the previous trip and the previous trip includes information not included in the new trip. The previous trip data and information may be similarly updated with information included in the new trip. In this manner, presumed missing data and/or information from a received or stored trip may be updated based on a determining and comparison to a similar trip of the database. This and other benefits may be realized through comparison of new trip information to information associated with previous trips taken by the vehicle or another vehicle.

These and various other arrangements will be described more fully herein. As will be appreciated by one of skill in the art upon reading the following disclosure, various aspects described herein can be a method, a computer system, or a computer program product. Accordingly, those aspects can take the form of an entirely hardware implementation, an entirely software implementation, or at least one implementation combining software and hardware aspects. Furthermore, such aspects can take the form of a computer program product stored by one or more computer-readable storage media having computer-readable program code, or instructions, included in or on the storage media. Any suitable computer-readable storage media can be utilized, including hard disks, CD-ROMs, optical storage devices, magnetic storage devices, secure digital cards (SD cards), solid-state drives (SSDs), cloud storage, and/or any combination thereof. In addition, various signals representing data or events as described herein can be transferred between a source and a destination in the form of electromagnetic waves traveling through signal-conducting media such as metal wires, optical fibers, and/or wireless transmission media (e.g., air and/or space).

FIG. 1 illustrates an operating environment 100 in accordance with at least one implementation. The operating environment 100 includes at least one client device 110, at least one classification server system 120, and/or at least one vehicle 130 in communication via a network 140. Client devices 110 and classification server systems 120 can allow for users to obtain telematics data from vehicles 130, generate trips, and/or classify trips, vehicles, and the like. The network 140 can include a local area network (LAN), a wide area network (WAN), a wireless telecommunications network, and/or any other communication network or combination thereof. Any of the devices and systems described herein can be implemented, in whole or in part, using one or more computing devices described with respect to FIG. 2. For example, classification server system 120 may include one or more processors 114 and a non-transitory memory 112. Client devices 110 and/or the at least one vehicle 130 may include similar components, in addition to other components described below.

Vehicle 130 can be, for example, an automobile, motorcycle, scooter, bus, recreational vehicle, boat, or other vehicle for which sensor or crash data can be collected and analyzed. A telematics device within the vehicle 130 can be used to collect and/or receive sensor data and/or to receive sensor data from the vehicle 130. A telematics device can be, for example, mobile phones, personal digital assistants (PDAs), tablet computers, laptop computers, smartwatches, and other devices that can be carried by drivers or passengers inside or outside of the vehicle 130. The telematics device can also be integrated into the vehicle 130 and/or connected to a data bus within the vehicle 130 via a diagnostic connector, such as an OBD-II connector. The telematics device can receive a variety of data, such as acceleration, velocity, location, vehicle operation data such as braking, turning, swerving, and the like from sensors located within the telematics device and/or vehicle. For example, a telematics device having a Global Positioning System (GPS) receiver can determine vehicle location, speed, direction, and other basic driving data without needing to communicate with vehicle sensors or external vehicle systems. However, it should be noted that any of a variety of other location determination techniques, such as location determined based on wireless networks to which the mobile device is connected, such as Wi-Fi networks, cellular networks, and the like, can also be used. The sensors of the telematics device, such as a GPS and/or a compass, can sense the speed and/or direction at which the telematics device (and accordingly vehicle 130) is traveling. An accelerometer of the telematics device can sense the acceleration of the mobile device. A gyroscope can be used to determine the orientation of the mobile device. In some aspects, orientation can be detected, for example, at a rate of 90 Hz. The gyroscope can also be used to measure the speed of rotation of the telematics device. A magnetometer can be used to measure the strength and direction of the magnetic field relative to the telematics device. The data collected by the telematics device can be stored and/or analyzed within the telematics device. Additionally or alternatively, the telematics device can transmit, via a wired or wireless transmission network, the data to one or more computing devices for storage and/or analysis. In a variety of implementations, the telematics device transmits data indicating a route the vehicle or driver has traveled, including multiple points along the route of travel. As explained in more detail below, the location points of the route may include a latitude value, a longitude value, and a sequence value. Other location services and systems may provide alternative or additional information to locate the vehicle or driver along a route or "trip".

Vehicle 130 can further include a short-range communication system. The short-range communication systems can be a vehicle-based data transmission systems configured to transmit vehicle operational data to other nearby vehicles, and to receive vehicle operational data from other nearby vehicles. In some examples, communication system can use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems need not use DSRC, and can be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. Vehicle-to-vehicle (V2V) transmissions between the short-range communication system can be sent via DSRC, Bluetooth, satellite, GSM infrared, IEEE 802.11, WiMAX, RFID, and/or any suitable wireless communication media, standards, and protocols. In certain systems, the short-range communication system can include specialized hardware installed in vehicle 130 (e.g., transceivers, antennas, etc.), while in other examples the short-range communication system can be implemented using existing vehicle hardware components (e.g., radio and satellite equipment, navigation computers) or can be implemented by software running on a telematics device within (or near) the vehicle 130. The range of V2V communications can depend on the wireless communication standards and protocols used, the transmission/reception hardware (e.g., transceivers, power sources, antennas), and other factors. Short-range V2V communications can range from just a few feet to many miles, and different types of driving behaviors, vehicle operational parameters, and the like, can be determined depending on the range of the V2V communications.

V2V communications also can include vehicle-to-infrastructure (V2I) communications, such as transmissions to or from vehicles to or from non-vehicle receiving devices, such as infrastructure. Infrastructure can include one or more of toll booths, railroad crossings, parking garages, road segments, parking lots, buildings or other structures, and/or road-side traffic monitoring devices which can include one or more sensors for detecting environmental conditions (e.g., weather, lighting, etc.) as well as parking availability. Certain V2V communication systems can periodically broadcast data from vehicle 130 to any other vehicle or other infrastructure device capable of receiving the communication within the range of the vehicle's transmission capabilities. For example, vehicle 130 can periodically broadcast (e.g., every 0.1 second, every 0.5 seconds, every second, every 5 seconds, dynamically, etc.) certain vehicle operation data via its short-range communication system, regardless of whether or not any other vehicles or reception devices are in range. In other examples, a short-range vehicle communication system can first detect nearby vehicles and receiving devices and can initialize communication with each by performing a handshaking transaction before beginning to transmit its vehicle operation data to the other vehicles and/or devices. Broadcasts from infrastructure can also have varying ranges and, in some examples, infrastructure can broadcast to an intermediate station which can then relay the information to one or more computing devices.

The types of vehicle operational data, vehicle driving data, breakdown issue data, or the like, transmitted to or from vehicle 130 and/or infrastructure can depend on the protocols and standards used for the V2V or V2I communication, the range of communications, and other factors. In certain examples, vehicle 130 can periodically broadcast corresponding sets of similar vehicle driving data, such as the location (which can include an absolute location in GPS coordinates or other coordinate systems, and/or a relative location with respect to another vehicle or a fixed point), speed, and direction of travel. In certain examples, the nodes in a V2V (or V2I) communication system (e.g., vehicles and other reception devices) can use internal clocks with synchronized time signals and can send transmission times within V2V (or V2I) communications so that the receiver can calculate its distance from the transmitting node based on the difference between the transmission time and the reception time. The state or usage of the vehicle's controls and instruments can also be transmitted, for example, whether the vehicle 130 is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's internal systems that the vehicle is skidding, that an impact has occurred, or that the vehicle's airbags have been deployed, that a vehicle has stopped unexpectedly, also can be transmitted in V2V (or V2I) communications.

In various other examples, any data collected by any vehicle sensors potentially can be transmitted via V2V or V2I communication to other nearby vehicles or infrastructure devices receiving V2V or V2I communications from a short-range communication system. Further, additional vehicle driving data not from the vehicle's sensors (e.g., vehicle make/model/year information, driver insurance information, driving route information, vehicle maintenance information, driver scores, etc.) can be collected and transmitted using V2V or V2I communications to nearby vehicles and other receiving devices using the short-range communication system.

The data transferred to and from various devices in operating environment 100 can include secure and sensitive data. Therefore, it can be desirable to protect transmissions of such data using secure network protocols and encryption and to protect the integrity of the data when stored on the various computing devices within the software deployment system. For example, a file-based integration scheme or a service-based integration scheme can be utilized for transmitting data between the various computing devices. Data can be transmitted using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In many implementations, one or more web services can be implemented within the various computing devices. Web services can be accessed by authorized external devices and users to support input, extraction, and manipulation of data between the various computing devices in the operating environment 100. Web services built to support a personalized display system can be cross-domain and/or cross-platform and can be built for enterprise use. Such web services can be developed in accordance with various web service standards, such as the Web Service Interoperability (WS-I) guidelines. Data can be transmitted using the Secure Sockets Layer (SSL) or Transport Layer Security (TLS) protocol to provide secure connections between the computing devices. Web services can be implemented using the WS-Security standard, which provides for secure SOAP messages using XML encryption. In still other examples, a security and integration layer can include specialized hardware for providing secure web services. For example, secure network appliances can include built-in features such as hardware-accelerated SSL and HTTPS, WS-Security, and/or firewalls. Such specialized hardware can be installed and configured in the operating environment 100 in front of one or more computing devices describe herein such that any external devices can communicate directly with the specialized hardware.

It will be appreciated that the network connections shown are illustrative and other means of establishing a communications link between the computers can be used. The existence of any of various network protocols such as TCP/IP, Ethernet, FTP, HTTP and the like, and of various wireless communication technologies such as GSM, CDMA, WiFi, and WiMAX, is presumed, and the various computing devices described herein can be configured to communicate using any of these network protocols or technologies.

Figure 2:
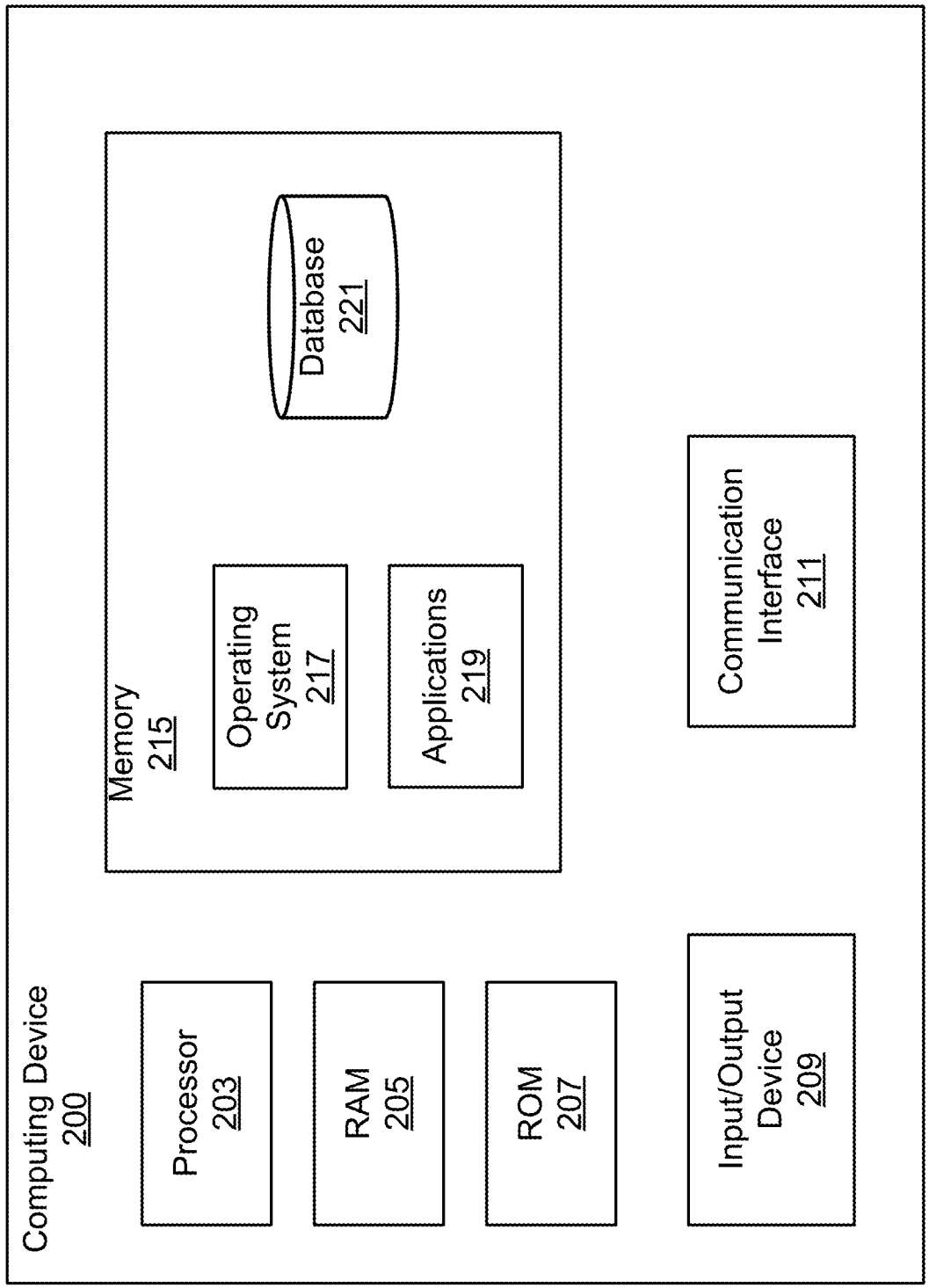
FIG. 2 illustrates one an example computing device that may be used to identify trip similarities from telematics data.

Turning now to FIG. 2, a computing device 200 in accordance with at least one implementation is shown. The computing device 200 can include a processor 203 for controlling overall operation of the computing device 200 and its associated components, including RAM 205, ROM 207, input/output device 209, communication interface 211, and/or memory 215. A data bus can interconnect processor(s) 203, RAM 205, ROM 207, memory 215, I/O device 209, and/or communication interface 211.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. Software can be stored within memory 215 to provide instructions to processor 203 allowing computing device 200 to perform various actions. For example, memory 215 can store software used by the computing device 200, such as an operating system 217, application programs 219, and/or an associated internal database 221. The various hardware memory units in memory 215 can include volatile and nonvolatile, removable, and non-removable media implemented in any method or technology for storage of information such as computer-readable instructions, data structures, program modules or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 203.

Communication interface 211 can include one or more transceivers, digital signal processors, and/or additional circuitry and software for communicating via any network, wired or wireless, using any protocol as described herein. Processor 203 can include a single central processing unit (CPU), which can be a single-core or multi-core processor (e.g., dual-core, quad-core, etc.), or can include multiple CPUs. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches, for example, CPU caches used by the processor 203, page caches used by the operating system 217, disk caches of a hard drive, and/or database caches used to cache content from database 221. For implementations including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a database 221 is cached in a separate smaller database in a memory separate from the database, such as in RAM 205 or on a separate computing device. For instance, in a multi-tiered application, a database cache on an application server can reduce data retrieval and data manipulation time by not needing to communicate over a network with a back-end database server. These types of caches and others can be included in various implementations and can provide potential advantages in certain implementations of software deployment systems, such as faster response times and less dependence on network conditions when transmitting and receiving data.

Although various components of computing device 200 are described separately, functionality of the various components can be combined and/or performed by a single component and/or multiple computing devices in communication.

Figure 3:
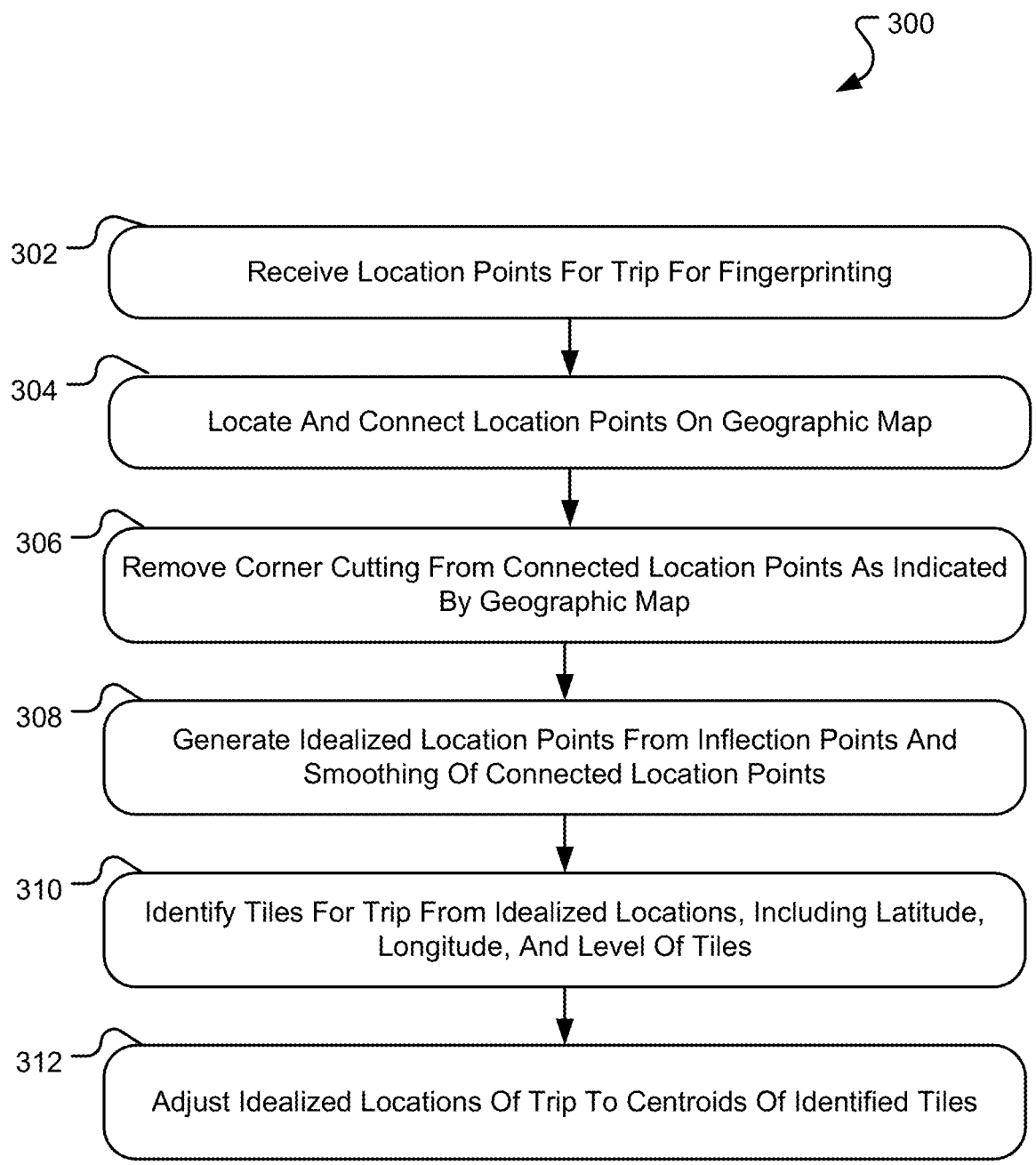
FIG. 3 is a flowchart illustrating an example method for determining a plurality of tile identifiers for classifying a trip.

Turning now to FIG. 3, a method 300 for determining a plurality of tile identifiers for classifying a trip is presented. More particularly, the classification server system 120 may receive information or data associated with a trip taken by the vehicle 130. In general, the vehicle 130 may travel from a starting point to an ending point. During the travel, a GPS or other location service or device integrated into the vehicle 130 and/or client devices 110 may provide periodic location information or data to the server system 120, such as a longitude value, a latitude value, an elevation value, speed, direction, etc. corresponding to a location of the vehicle at points along the trip. This information may be transmitted, by the vehicle 130 and/or client devices 110, to the classification server system 120 via network 140. In one implementation, the location service executed by the vehicle 130 and/or client devices 110 may determine the information or data at a regular period during the trip, such as every 5 seconds or any other duration. Other location services may obtain location information of the vehicle and/or operator of the vehicle at other durations, regularly or irregularly. Regardless, the classification server system 120 may receive one or more location data points of the vehicle 130 and/or driver during a trip. In one implementation, such information may be sequenced such that each instance of location data may further include a sequence identifier that orients the data within a larger trip. For example, a first instance of location data may include a sequence identifier of "1". A second instance of location data transmitted to the classification server system 120 may include a sequence identifier of "2", and so on. Further, a beginning and/or ending of a trip may be determined from the received location information. For example, the location information may indicate that the location device is stationary for some period of time, followed by a change in location at a speed exceeding a human pace for walking or running. This change is speed and location may indicate the beginning of a new trip. An ending of a trip may be based on a determination that the location device has stopped moving or slowed for another period of time, indicating that the vehicle and/or location device has arrived at a destination and stopped. In still another example, the location device, such as a GPS-enabled client device 110, may receive inputs requesting a suggested route from a starting location to an ending location. These inputs may be transmitted to the server system 120 and used to define a beginning and ending of a trip.

At operation 302, the classification server system 120 may receive the location points for a trip for use in fingerprinting the trip. As mentioned, the location points may include a longitude value, a latitude value, and a sequence value, among other data. A series of such location points may be collected and transmitted to the classification server system 120. The location points may be identified as belonging to a single trip or route based on many factors, including geographic locations indicated by the data, proximity in time to the collection of the data, an indication from a client device 110 of a single trip (such as requesting a route through the client device to a indicated destination), and the like. In some instances, the location points may be received while the trip is occurring or may be collected at the vehicle 130 or client device 110 and provided to the classification server system 120 after the trip is complete.

At operation 304, the server system 120 may locate one or more of the received location points on a geographic map. For example, FIG. 4A illustrates an example geographic map 400 with located received location points 402 of a trip identified within the map. The geographic map 400 may therefore be sized to accommodate each of the received location points 402 for a trip, based on a latitude/longitude value of each location or any other geographic location information. In one instance, the geographic map 400 may include known roads, landmarks, businesses, addresses, traffic rules, current and historic traffic patterns, status of the known roads, other types of transportation systems (bus routes, train tracks, light rail tracks, etc.), and the like. The information within the geographic map 400 may be obtained from a database of geographic information, maintained by or otherwise associated with the server system 120 or from a third-party database of geographic information. In some instances, the server system 120 may not locate with received location points 402 into a visual geographic map such as that illustrated in FIG. 4A. Rather, the geographic information obtained from the geographic database may be indexed by any location information, such as a latitude value and/or a longitude value. Comparison of the received location points 402 to the geographic information in the database may be executed by determining a difference between the location information of the received location points and the location information of the geographic database such that no visual representation of the geographic map is generated. In some instances, a visual representation of the received location points 402 of the trip in a geographic map 400 may be generated to aid a user of the server system 120 in visualizing the parameters of the trip. Such visual maps are used herein for example purposes only and should not be construed as limiting the methods and systems described herein.

As shown in the geographic map 400 of FIG. 4A, each received location point 402 may be located within the map. As the received location points 402 may include a sequencing value, the server system 120 may also determine a starting point and an ending point for the trip. Further, the server system 120 may connect the location points 402 with a straight line 404 in the geographic map 400 to generate an initial trip path based on the location points. The initial trip path may be generated independent of the known roads or other geographic information obtained for the geographic map 400.

At operation 306, the server system 120 may remove corner cutting from the connected location points 402 based on the road, landmark, and other information included in the geographic map 400. For example, FIG. 4B illustrates an example geographic map 410 with located received location points 402 of a trip identified within the map, connecting lines 404 between the location points, and added location points 416 to account for corner cutting along the received location points. The geographic map 410 may define the same geographic area as the map 400 described above with relation to FIG. 4A, including the received location points 402 of the trip and the connections 404 between the points. The server system 120 may change, amend, or otherwise alter the connected location points 402 to correspond to road or other information associated with the geographic map 410. For example, a comparison of the connected location points 402 to the locations of roads within the geographic map 410 may indicate that a connection between two points (such as connection 412) traverses a path that does not correspond to a known road. Rather, because the connections 404 between the locations 402 are assumed to be straight lines in the initial route, some connections may bisect a corner defined by the roads of the map 410. Such a circumstance may occur if a vehicle travels to and turns at an intersection between collection of the vehicle's location.

The comparison of the connected points 402 to the road information of the geographic map 410 may indicate such a cut corner. The server system 102 may, in response, add one or more connecting lines 414 to the determined path that follows an assumed path of the vehicle along the roads, adding the corner route into the vehicle path. In addition to the added corner paths 414, the server system 120 may, at operation 308, also add a new location point 416 at the inflection point of the added corner paths 414. The server system 120 may treat these added inflection points 416 in a similar manner as a received location point. For example, the server system 120 may generate location information (such as a latitude value and/or a longitude value) and a sequence value for the added inflection point 416. This information may be inserted into add into a list of location points 416 for the trip based on the generated sequence value for the determined inflection point 416. The server system 120 may insert any number of inflection points 416 into the list of location points 402 for the trip based on the road information of the geographic map 410. The server system 120 may therefore generate an idealized collection of location points from the inflection points 416 and the connected location points 402. In one implementation, the server system 120 may apply one or more smoothing techniques to the connected location points 402 to remove anomalies within the received location data. The smoothed connections 404 between the location points 402 may be included in the idealized route for the trip.

At operation 310, the server system 120 may identify one or more tiles corresponding to the location points 402, 416 of the idealized route for the trip. For example, the server system 120 may generate and/or maintain tiling information corresponding to each location within a geographic region, such as a city, a state, a country, or the entire world. The tiling information may comprise a plurality of individual tiles of a square or rectangular shape that each correspond to an area of the covered geographic region. In one implementation, the edges of each tile may be defined by a latitude value or a longitude value, such that all geographic locations within the defined edges may be considered as belonging to that particular tile. In this manner, every geographic location within the covered geographic region may be associated with a tile. Further, each tile in the plurality of tiles may be associated with a unique tile identifier comprising any value, such as a numerical value or an alphanumeric identifier.

As shown in the geographic map 420 of FIG. 4C, each of the location points 422 of the idealized trip route may be associated with a corresponding tile 424 from the plurality of tiles. In particular, the server system 120 may determine a geographic location (such as a latitude value and a longitude value) for each of the location points 422 of the idealized route. A tile 424 that contains each of the determine geographic locations of the location points 422 may then be identified by the server system 120. In one implementation, the server system 120 may obtain a list of the tile identifiers for the corresponding tiles 424. In some instances, more than one location point 422 may be located within an identified tile 424. The server system 120 may, in such circumstances, identify the tile 424 corresponding to the multiple location points 422, but only include one instance of the tile identifier in a list of trip route tile identifiers.

In addition, the server system 120 may identify a tile granularity value that corresponds to a size of the tiles identified for the idealized trip route, also referred to as a tile level value. A tile level value may be associated with a geographic distance of one or more of the edges of the tiles applied to the idealized trip route. For example, a level 1 tile may include an edge corresponding to 1 kilometer (km) in distance in the geographic map 420, such that a level 1 tile with equal 1 km edges may cover a 2 km² geographic area. In another example, a level 30 tile may include edges corresponding to centimeters of distance, covering a few centimeters squared area of the geographic area. In general, the edges of the tiles may be any distance and may be selected by the server system 120 to increase or decrease the granularity of the identified tiles included in the list of tile identifiers associated with the idealized trip route. The level of the identified tiles, in addition to the latitude value and/or longitude value, may be determined by the server system 120 at operation 310.

At operation 312, the server system 120 may adjust the idealized location points for the trip to a centroid location 432 within the identified tiles 424, as illustrated in the map 430 of FIG. 4D. In some instances, multiple location points 422 of the trip may be located within a single tile, such as idealized location points 426 of FIG. 4C. Adjusting the idealized points 422 for the trip to a centroid location 432 may include combining those locations within the trip into a single location corresponding to a centroid location within the tile area. In other instances, however, the server system 120 may retain all idealized location points 422 of the trip with or without adjusting the location to a centroid 432 of the identified tiles 424 of the trip. Through the method 300 of FIG. 3, the server system 120 may generate a trip for fingerprinting based on locations received during the trip.

As mentioned above, it may be useful to classify or identify a trip for comparison to other trips to determine if two or more trips are identical or similar. For example, a vehicle may be driven from a starting location (such as a home of a driver or user of the server system 120) to an ending location (such as the driver or user's place of business), occurring most weekday mornings. In order to classify the trip as a recognized trip or a trip that is similar to other trips traversed by the vehicle, the server system 120 may generate a trip identifier or fingerprint that classifies the trip based on the location points received during the trip. Once identified, the trip may be compared to identifiers of other trips taken by the vehicle or other vehicles for classification of the trip, among other analysis. In this manner, similar trips of a vehicle or vehicles may be identified without a direct comparison between the various location points for the trips, increasing the speed of trip similarity identification by the server system 120.

Figure 5:
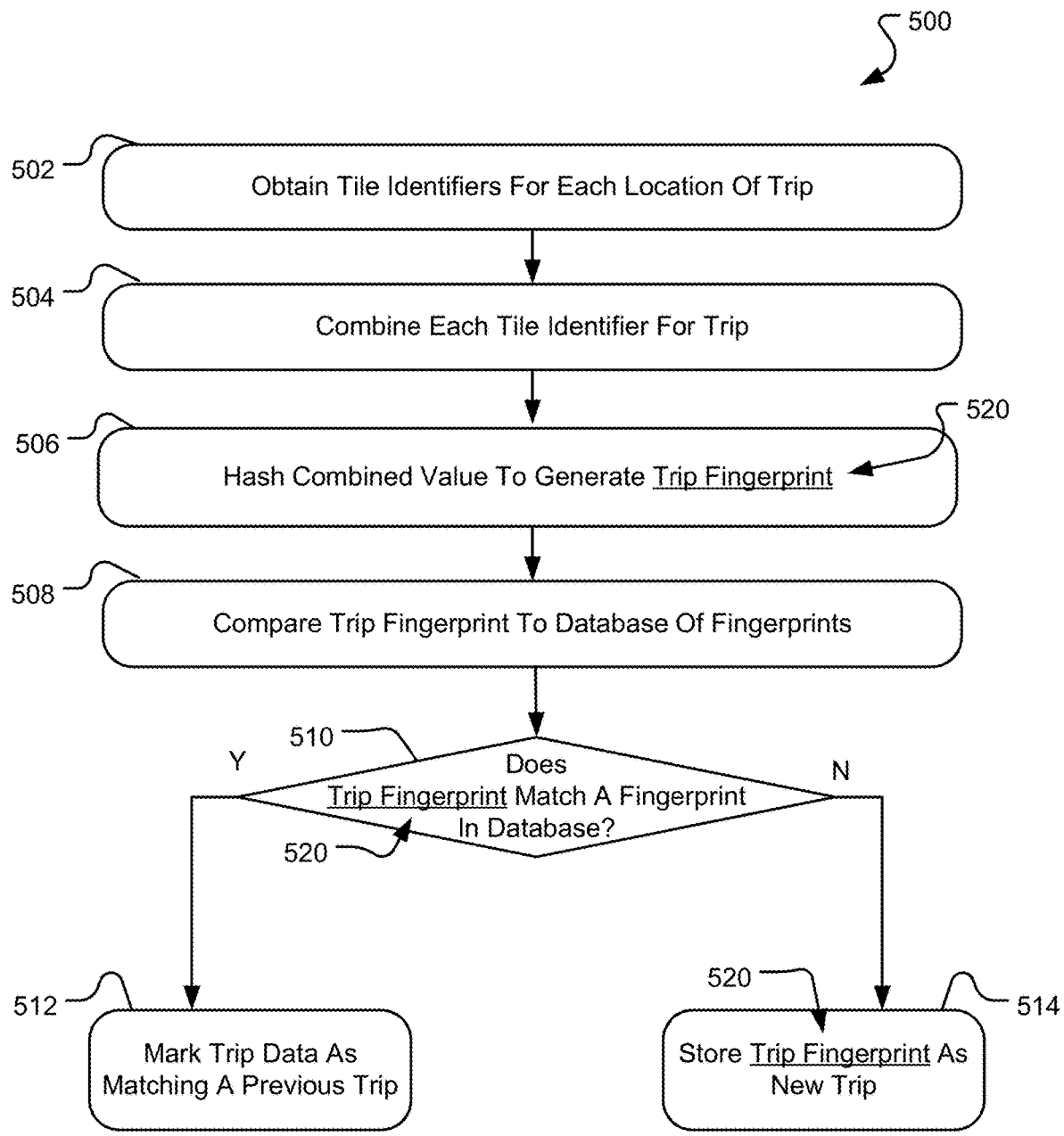
FIG. 5 is a flowchart illustrating an example method for determining a plurality of trips as similar based on a trip fingerprint value.

FIG. 5 is a flowchart illustrating an example method 500 for determining a plurality of trips as similar based on a trip fingerprint value. The operations of the method 500 may be performed or executed by the server system 120, the user device 110, one or more computing devices of a vehicle 130, or any combination of the devices of operating environment 100 of FIG. 1. In one implementation, the server system 120 may perform the method 500 to determine if a newly received trip is similar to a previous trip taken by a vehicle, a driver of the vehicle, or other vehicles or drivers. For example, the server system 120 may identify a received trip as similar to a trip the same vehicle traversed the previous day, such as a user's drive from home to work. The server system 120 may process the data associated with the received trip that is similar to a previous trip differently based on an identification of the trip being similar to the previous trip, such as averaging the data corresponding to multiple trips identified as similar by the server system.

Figure 6:
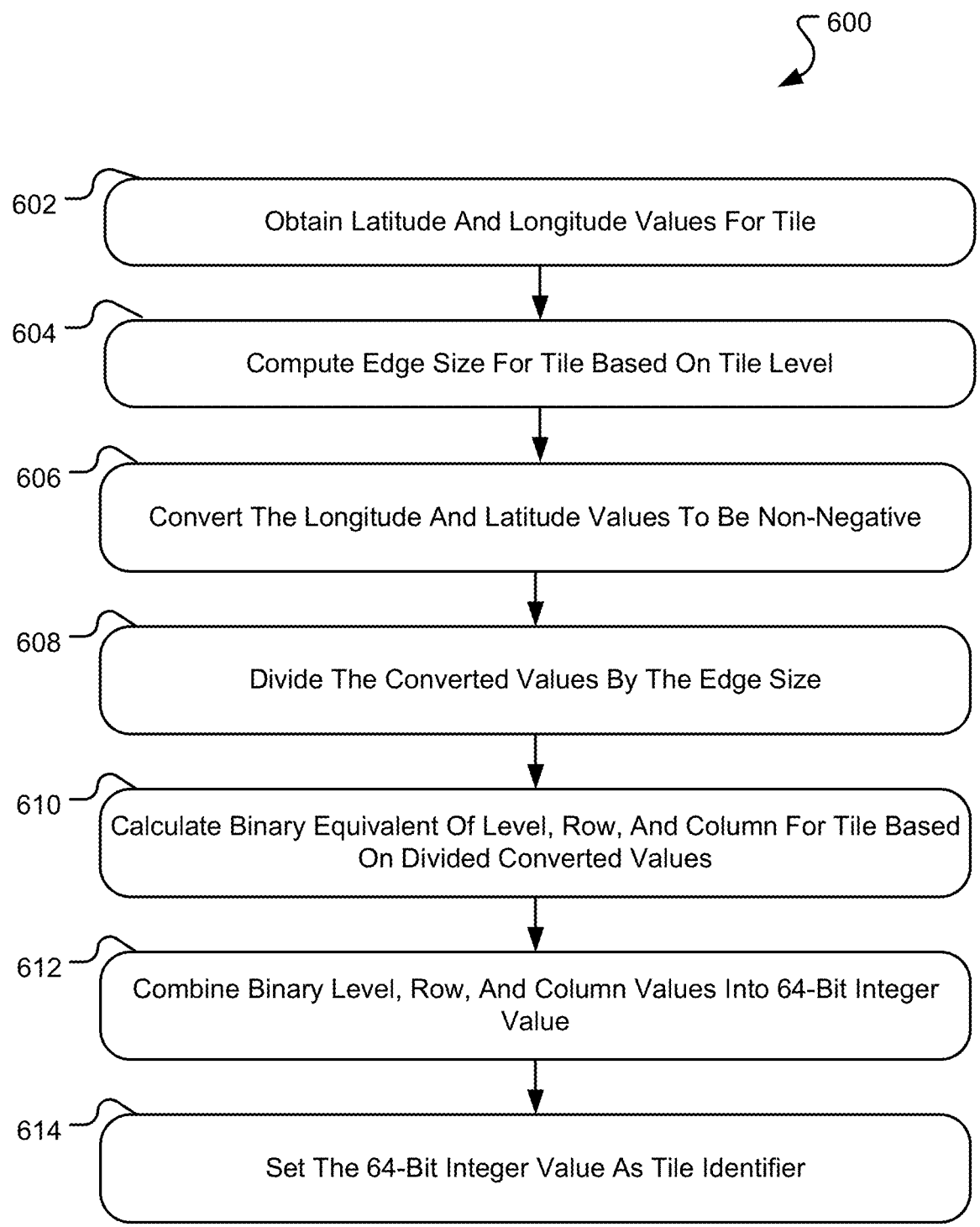
FIG. 6 is a flowchart illustrating an example method for generating a tile identifier for use in calculating a fingerprint identity for a trip.

Beginning at operation 502, the server system 120 may obtain one or more tile identifiers for a received trip. As described above, one or more tiles 424 may be associated with location points 402 or idealized location points 422 of a given trip. Each identified tile 424 may be associated with a unique identifier such that the server system 120 may obtain a list of the unique identifiers for the tiles 424 of the trip. The tile identifier for each tile 424 may be generated through any technique for generating a unique value. One particular example of a method 600 for generating a unique identifier for a tile 424 is illustrated in FIG. 6. In one implementation, the operations of the method 600 may be performed for each identified tile upon receipt of location points of a trip. In another example, the operations of the method 600 may be performed for each tile of a geographic region and stored in a database for use in generating a trip fingerprint. Regardless, any device of the operating environment 100 of FIG. 1 or any other computing device not illustrated may perform the operations of the method 600.

For an implementation in which the tile identifier is determined upon receipt of the locations of the trip, the server system 120 may obtain a latitude and/or longitude value for an identified tile 424 at operation 602. More particularly, the server system 120 may determine a latitude and longitude value for the centroid location 432 of the tile 424 for the idealized route locations, as discussed above. In other implementations, the server system 120 may determine a latitude and/or longitude value for another location within the tile 424, such as one or more locations within the tile as received from a routing device, a lower lefthand corner location of the tile, an upper righthand corner location of the tile, and the like. At operation 604, the server system 120 may compute an edge size for the tile 424 based on a tile level value. As discussed above, a tile level value may be associated with a geographic distance of one or more of the edges of the tiles 424. For example, a level 1 tile may include an edge corresponding to 1 kilometer (km) in distance in the geographic map 420 and a level 30 tile may include edges corresponding to a few centimeters of distance. Thus, each edge of a tile 424 may correspond to a distance within the geographic map 420 based on a tile level value for that tile. The server system 120 may therefore determine a distance or length of one or more of the edges of the tile 424.

At operation 606, the server system 120 may convert the obtained longitude value and/or latitude value to be a non-negative number. For example, a longitude value of −87.657713 may be converted to non-negative by commuting the number by a value of 180 degrees to ensure that value is a non-negative value. Latitude values may similarly be converted by a value of 90 degrees to ensure a non-negative value. At operation 608, the converted longitude value and latitude value may both be divided by the calculated edge size to generate a row value (from the converted latitude value) and a column value (from the converted longitude value). At operation 610, the generated row value, column value, and/or the tile level may be converted into a binary equivalent value and, at operation 612, a string of binary bits may be generated by appending the binary values of the row, column, and level of the tile. In one particular implementation, the binary row value may be appended at the beginning of the tile level binary value and the binary column value may be appended to the beginning of the binary row value. However, the binary values of the row, column, and tile level may be appended or combined in any manner. At operation 612, the combined binary row, column, and level values may be converted into an integer value, such as a 64-bit integer value. This integer value may be assigned as the unique tile identifier for the given tile.

Returning to the method 500 of FIG. 5, the server system 120 may obtain the unique tile identifiers for each tile 424 identified for the given trip and, at operation 504, may combine each of the tile identifiers into a trip tile value. Combining the trip tile identifiers may include any technique to combine a plurality of integer values, including taking the average of the integer values, adding the integer values, determining a mean of the integer values, and the like. In one particular example, the tile identifiers may be 64-bit integer values and combining the identifiers may include adding the 64-bit values for each tile of the trip together to calculate the combined tile identifiers value. At operation 506, the server system 120 may execute a hashing function on the combined tile identifiers value to obtain a fingerprint 520 or identifier for the trip. In general, the server system 120 may utilize any known or hereafter developed hashing technique to convert the combined tile identifiers value to the trip fingerprint. In one particular implementation, the hashing technique may be repeatable such that a trip fingerprint value 520 may be the same given the same input tile identifier values. In other implementations, other types of conversion technique may be utilized to convert the combined tile identifiers into a trip fingerprint. Regardless of the techniques utilized, a trip fingerprint may be generated from the tile identifiers associated with a received trip.

To determine if a received trip is similar to a previously stored trip based on the obtained trip fingerprint value 520, the server system 120 may, at operation 508, compare the generate trip fingerprint to a database of trip fingerprints to determine if the fingerprint value of the received trip matches a stored fingerprint value. In general, the server system 120 may maintain or otherwise be in communication with a database of trip fingerprints that have been previously calculated or determined. In one example, the server system 120 may store trip fingerprints for individual users or vehicles such that each trip fingerprint may be associated with a particular user identifier. Thus, the server system 120 may compare a determined trip identifier 520 for a received trip to other trips associated with the same user, vehicle, location device, computing device, etc. In another example, the server system 120 may compare the determined trip fingerprint to trip fingerprints of other vehicles or users stored in the database to determine if the received trip is similar to other trips taken by other vehicles or users. The server system 120 may therefore compare the trip fingerprint to any other stored or otherwise maintained trip fingerprints in the database.

At operation 510, the server system 120 may determine if the calculated trip fingerprint value 520 of the received trip matches a trip fingerprint in the database. If the calculated trip fingerprint value 520 matches a trip fingerprint in the database, the server system 120 may, at operation 512, generate an indication that the received trip matches or is otherwise similar to a previously fingerprinted trip. In one implementation, the server system 120 may store the received trip as the latest received instance of that trip type, replacing a previously stored similar trip fingerprint. In another example, the server system 120 may discard the received trip data as duplicative of an already stored similar trip. In still another example, the server system 120 may store a value with the trip data indicating the similarity of the received trip with a previously stored trip. In still another example, the server system 120 may assign a classification label to the new trip data as being similar to a previously received trip. For example, the server system 120 may create a label for the new trip data that refers to the previously received trip data as a similar trip. Such a label may include associating a label of "Trip A" to the previously received trip data and a label of "Trip A (2)" to the new trip data. In general, the server system 120 may assign any type of labels to the new trip data and the previously received trip data to indicate the two trips are related or similar. If the server system 120 determines that the trip fingerprint does not match a stored fingerprint from the database, the system may, at operation 514, store the trip data as a new trip that is not similar to a previously captured trip.

Through the systems and methods above, a computing device or system, such as server system 120, may identify received data as similar to a previously received trip by generating a fingerprint of the trip and comparing the fingerprint to previously stored fingerprints. By utilizing a trip fingerprint generated from the location points received from a locating device and corresponding to the trip, a determination of a similarity of the trip to a previous trip may occur much faster than a one-to-one comparison of the location points. This may improve the processing of new trips and reduce the processing load at the computing device or system.

In addition, identification of similarities between trips may be used to improve the accuracy of a received trip or a previously stored trip. For example, once a trip is identified as being similar to a previous trip, aspects of the previous trip may be imported to a newly received trip to correct misinformation or data. Newly received trip data may also be used to correct or supplement data from a previous trip based on a determination of a trip similarity of the new trip to the previous trip. In this manner, the trip data may be utilized to augment, rectify, correct, or otherwise alter trip data to generate more accurate trip fingerprints and trip data for further processing.

Figure 7:
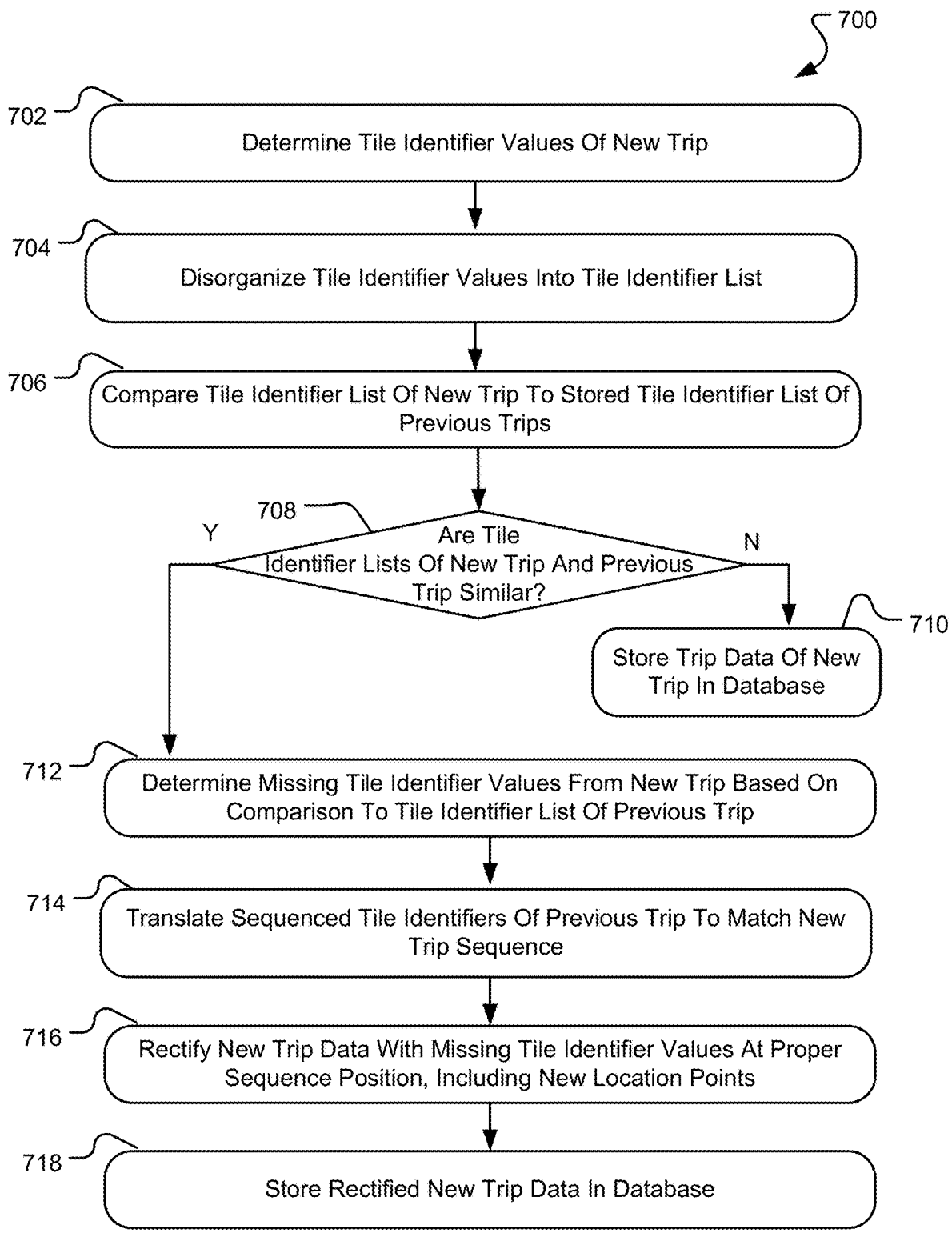
FIG. 7 is a flowchart illustrating an example method for rectifying new trip data based on data associated with similar previous trip data.

FIG. 7 is a flowchart illustrating an example method 700 for rectifying new trip data based on data associated with similar previous trip data. The operations of the method 700 may be performed or executed by the server system 120, the user device 110, one or more computing devices of a vehicle 130, or any combination of the devices of operating environment 100 of FIG. 1. The operations may be performed to correct one or more trips received at the vehicle 130, user device 110, or server system 120 based on an identification of a similar previous trip.

At operation 702, tile identifier values of a new trip may be determined. As described above, a trip may include one or more location points that may or may not be idealized. One or more tiles corresponding to a geographic area may then be associated with the one or more location points, with each of the tiles having a unique tile identifier value. In one particular implementation, the tile identifier value is a 64-bit value, although any other type of identifier may be used with the methods and systems described herein. The tile identifier values may therefore be associated with the location points of a vehicle during a trip and, as described above, may be used to generate a fingerprint identifier of the trip. The tile identifier values may also be in a sequence as provided by a locating device (such as a GPS-enabled device), such that the first tile identifier of the trip may correspond to a starting point of the trip and the last tile identifier of the trip may correspond to an ending point of the trip. One method for determining the tile identifiers for a new trip is described in greater detail above with reference to FIG. 6. In one implementation, the tile identifier values may be determined as location points are received at a computing device, such as the server system 120, perhaps as a trip is occurring. In other implementations, the location point information may be transmitted to the computing device upon completion of the trip.

Figure 8A:
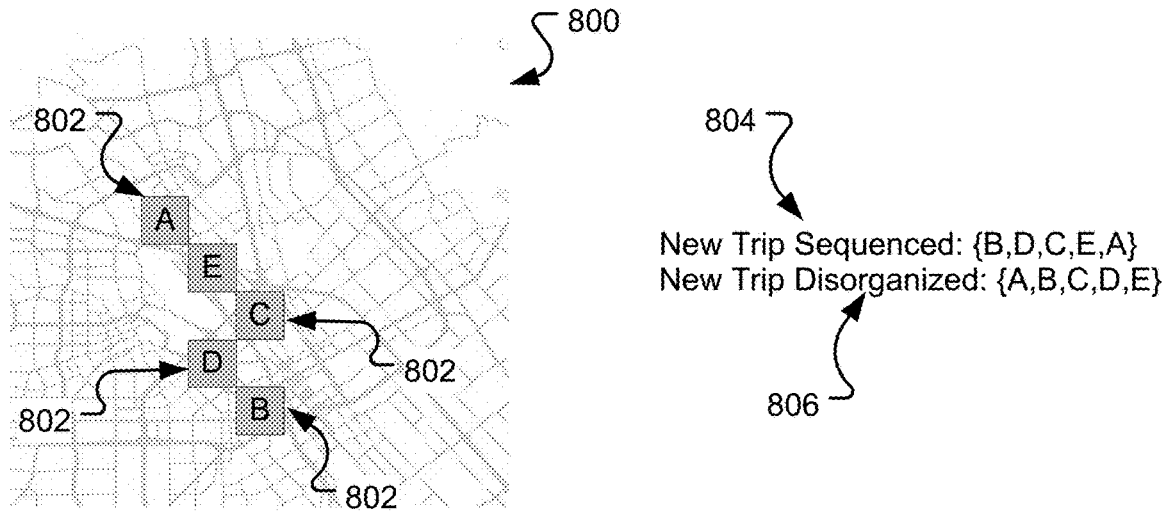
FIGS. 8A-8B depict a series of geographic maps with identified tiles associated with a new trip and identified tiles associated with a similar trip for use in rectifying new trip data.

As noted, the tile identifier values may be determined in a sequence corresponding to a trip sequence. For example, FIG. 8A illustrates a geographic map with tiles 802 associated with a new trip identified through the systems and methods above. In this example, the trip includes tiles B, D, C, E, and A. The tiles 802 may be identified from location points received from a locating device that are within the tiles. The sequence 804 of the new trip may include ordered tiles B, D, C, E, and A, indicating that the vehicle began at a location within tile B and progressed through tiles D, C, and E, with a trip ending at a location within tile A. In some instances, however, the tile identifier values for a trip may be stored in a disorganized manner or otherwise out of sequence. In general, the tile identifier values for a trip may be stored in any sequence. Thus, at operation 704, the tile identifier values for the new trip may be disorganized into a tile identifier list for the new trip. The tile identifier values may be listed in any manner. In one example, the tile identifier values may be numbers such that the tile identifier list for a trip may be listed in ascending or descending order. In another example, the tile identifier values may be alphanumeric values such that the tile identifier list may be in alphabetical order. As illustrated in the example of FIG. 8A, the tile identifier list 806 for the illustrated trip 800 may be stored in alphabetical order, such as tiles A, B, C, D, E. Storing the tile identifier lists of various trips may improve the speed of a computing device to compare one trip to another.

At operation 706, the tile identifier list for the new trip may be compared to one or more tile identifier lists of previous trips. In particular, a database of tile identifier lists corresponding to previously taken trips may be maintained and accessed. The previously stored tile identifier lists may correspond to trips taken by the vehicle, by an operator of the vehicle, or by any other vehicle or operator associated with the operating environment 100 of FIG. 1. Comparison of a tile identifier list of a new trip to one or more stored tile identifier lists of previous trips may be performed through an execution of any known or hereafter developed technique for comparing data lists to determine a similarity between two or more data lists. In one example, a Levenshtein technique may be employed to compare a first list of tile identifier values to a second list of tile identifiers. The Levenshtein technique outputs a "distance" value that correlates to similarity between two datasets. Other techniques for determining a similarity between two datasets have also been developed and may be utilized to determine a similarity between a first list of tile identifier values to a second list of tile identifiers, such as a Longest Common Subsequence, a Hamming distance algorithm, a cosine distance algorithm, and others. Those of ordinary skill in the art will understand the various techniques that may be utilized to determine such a similarity between a list of tile identifier values for the new trip to one or more lists of tile identifier values stored in a database.

Regardless of the comparison technique utilized, a comparison value may be determined corresponding to a similarity between a list of tile identifier values of a new trip to one or more lists of identifier values associated with one or more previous trips. In one implementation, the comparison value may be compared to a threshold value such that lists of tile identifier values that result in a comparison output that meets or exceeds the threshold value may be determined to be "similar" for use in correcting or amending data of the new trip. In another implementation, a comparison value that is less than the threshold value may indicate that the compared lists of identifier values are "similar" for use in correcting or amending data of the new trip. The threshold value for determining similarity between two lists of tile identifiers may be stored in a database, may be received from a user of a computing device of the operating environment 100 of FIG. 1, may be received from another computing device, may be generated by a computing device based on previous comparisons, and the like. In general, the threshold value may be adjustable to be more or less inclusive in determining the similarity of lists of tile identifier values associated with trips of a vehicle or user.

Figure 8B:
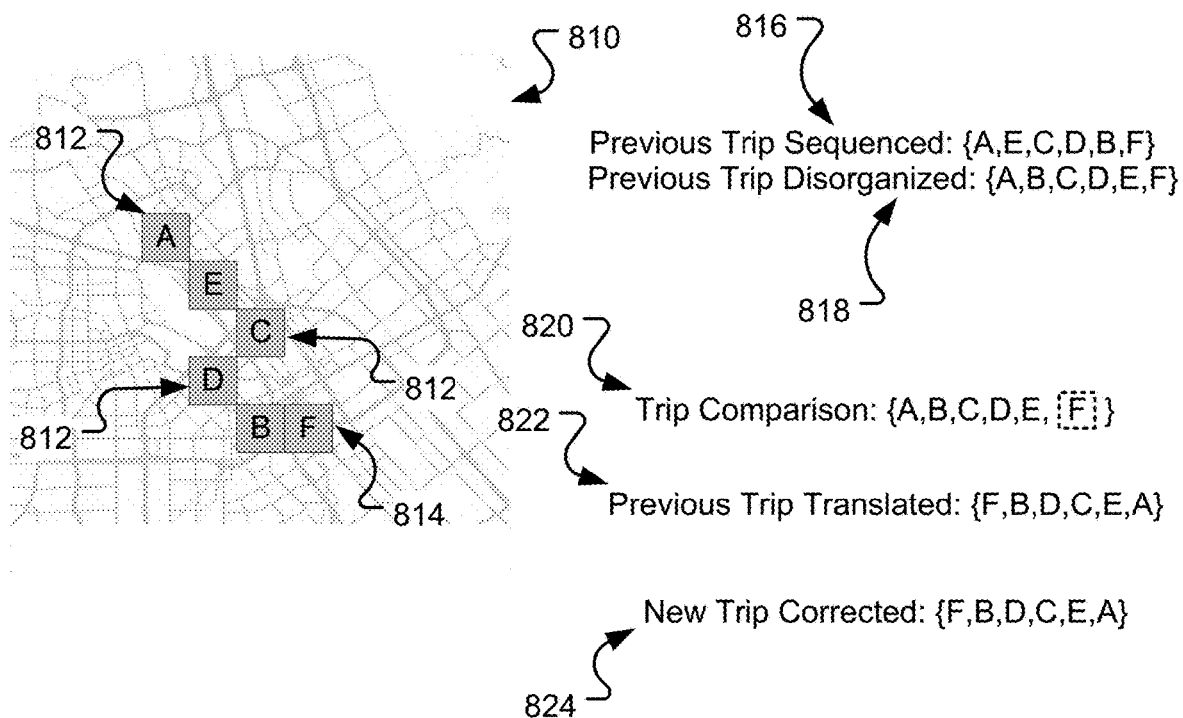

FIG. 8B illustrates a geographic map 810 with tiles 812 associated with a previous trip identified through the systems and methods above and stored in a database. The previous trip may include many of the same tiles 812 as the new trip, illustrated in the map 800 of FIG. 8A. In particular, the previous trip may include tile identifiers A, E, C, D, and B, as are included in the new trip of map 800. However, this previous trip may include a sequence that is reverse from the new trip such that the previous trip tile identifiers, when sequenced, may include the tiles A, E, C, D, and B. This sequence indicates that the previous trip started at a location within tile A and progressed through tiles E, C, D, and B. Further, the previous trip tile identifiers may also include tile F 814, such that the previous trip ended at a location within tile F. When disorganized or un-sequenced, the list of tile identifier values for the previous trip may include tiles A, B, C, D, E, and F as the tile identifiers may be listed in alphabetical order. As above, the tile identifiers may be listed in any order when stored in the database, such as in ascending order, descending order, alphabetical, etc. for ease in comparing.

Regardless of a technique used to compare a list of tile identifiers for a new trip to one or more lists of tile identifiers for previous trips, it may be determined at operation 708 if the tile identifier list of the new trip is similar to the tile identifier list of a previous trip. A determination that the lists are similar may be dependent upon a threshold value, as described above. If the list of tile identifiers for the new trip is not similar to a previous trip as determined by a comparison of the list of tile identifiers to one or more stored lists, data associated with the new trip may be stored in the database as a new trip with no correction or amendment to the trip data at operation 710. However, in some circumstances, the list of tile identifiers for the new trip may be determined to be similar to the list of tile identifiers for a previous trip based on the comparison. For example, a comparison technique may output a distance value that, when compared to a threshold value, may indicate the two lists of tile identifiers as similar. In the example illustrated in FIGS. 8A and 8B, the list of tile identifier values 806 for the new trip (i.e., A, B, C, D, E) differs from the list of tile identifier values 818 for the previous trip (i.e., A, B, C, D, E, F) by tile identifier F (as illustrated in trip comparison 820). Based on a comparison technique and a threshold value, it may be determined that the new trip is similar to the previous trip as differing by one tile. Other threshold values may allow for more variation between two compared lists of tile identifiers and, as described, may be tuned to be less or more inclusive in determining similarities between lists of tile identifiers.

At operation 712, one or more missing tile identifiers from the new trip list of tile identifiers may be determined based on the comparison to the previous trip list of tile identifiers. Continuing the above example, it may be determined the new trip is similar to the previous trip and that the list of tile identifiers of the new trip does not include tile F 814 while the list of tile identifiers for the previous trip does into tile F. Any number of missing tile identifiers may be determined as missing from either the list of identifiers of the new trip or the list of identifiers of the previous trip. For example, a comparison of a new trip with a previous trip may determine that the new trip does not include tiles X, Y, and Z (which may be included in the previous trip), while the previous trip does not include tile R (which may be included in the new trip). In this manner, both or either of the new trip and the previous trip may be analyzed to determine which tile identifiers are missing from either list, once the two trips are identified as being similar through the comparison techniques described above. However, an example of altering the list of tile identifiers for a new trip only is described herein for clarity purposes.

At operation 714, the sequenced tile identifiers of the previous trip may be translated to match a sequence of the new trip. For example and as illustrated in FIGS. 8A and 8B, the list of tile identifiers for the previous trip may be sequenced 816 based on the sequence of location points received during the previous trip as discussed above. As shown, the sequence of tile identifiers 816 indicates that the trip began at a location within tile A, traversing through tiles E, C, D, and B, and ending at a location within tile F 814. This sequence of tile identifiers is backwards from the tile identifier sequence of the new trip 804, which traverses from tile B through tiles D, C, E, and A. This may occur as vehicles and/or vehicle operators often traverse the same route in both directions. For example, a driver may traverse the route from tile B to tile A to travel from the driver's place of business to the driver's home. At the beginning of the day, the driver may have traveled the same route in the reverse direction, traveling from tile A to tile F to arrive at the driver's place of business from the driver's home. Often, vehicles may traverse the same route in different directions such that the route may be similar (as determined through the comparison technique described above) but have a different sequence. Thus, the list of tile identifiers of the previous trip 816 may be translated to be the same or similar sequence as the list of tile identifiers of the new trip 804. The translated sequence of tile identifiers for the previous trip is illustrated as sequence 822 of FIG. 8B, namely tile identifiers F, B, D, C, E, A to correspond to the tile identifier sequence of the new trip 804.

The sequence of tile identifiers of the previous trip may be translated into any format or order. For example, the sequence may be translated to a backwards sequence, as described above. In another example, only a portion of the sequence of tile identifiers for the previous trip may be translated, while other portions may remain untranslated. In general, the order of the tile identifiers for the previous trip 816 may be rearranged in any sequence to align with all or a portion of the sequence of tile identifiers of the new trip 804.

As noted above, new trip sequence 804 may correspond to a trip traversed in a first direction and previous trip sequence 816 may correspond to a trip traversing the same route in the opposite direction (such as when traversing from a driver's home to the driver's place of business). However, one or more location points along the trip may be missed or not logged such that one or more tiles along the trip may not be identified, such as tile F 814 included in the previous trip sequence 816 but not the new trip sequence 804, even though the route may be the same. Missing location points and/or tiles may occur for many reasons. In one example, the locating device obtaining location points along the trip may not start logging location points until some point into the trip, missing one or more of the starting location points along the trip route. For example, a vehicle may start at a location included in tile F in the new trip, but the location point may not be captured by the locating device in time to include in the trip sequence. Other tiles in a trip may also be missed, such as areas in which obstructions may prevent the locating device from obtaining a location point, short alternate routes that are traversed between logging of location points, and the like.

To reconstruct potentially missed tiles from a trip sequence, a computing device may analyze similar and translated trips stored in the database to amend a new trip sequence to add missing tiles into the trip sequence. For example, by identifying the previous trip tile identifiers 818 as similar to the new trip tile identifiers 806, missing tile F 814 may be determined to be missing from new trip sequence 804. Further, to determine a location within the trip sequence 804 for inserting an identifier for tile F, the previous trip sequence may be translated to follow a similar sequence as the new trip sequence. In one example, the previous trip sequence may be translated 822 such that the tile identifiers follow a reverse course, similar to the new trip sequence 804, although the previous trip sequence may be translated into any order based on the new trip sequence 804. From the translated sequence 822, the tile identifier sequence may be rectified or amended with one or more missing tile identifiers based on a position within the translated sequence of the missing tile at operation 716. For example, based on a comparison of the translated previous trip sequence 822 to the new trip sequence 804, it may be determined that tile F 814 is missing from the new trip sequence. Further, it may be determined that the tile F identifier is missing as the first tile in the sequence. Thus, the new trip tile sequence may be updated to include a tile identifier for tile F in the first position of the trip sequence, as illustrated in new trip corrected sequence 824, tiles F, B, D, C, E, A in this example. In this manner, missing tile identifiers may be inserted into a tile identifier sequence of a new trip based on one or more previous trips. In addition, location points associated with an inserted tile may also be added to the trip data for the new trip. In general, any information or data associated with the previous trip may be used to update, amend, or otherwise alter the data of the new trip. The updated or rectified data for the new trip may then be stored in the database at operation 718 for comparison to future trips and/or other processing of trip data.

Through the method 700 of FIG. 7, data or information associated with a new trip may be updated or augmented with data from a previous trip that is determined to be similar to the new trip. For example, a starting location may be not obtained by a locating device during a trip and not included in the sequence of location points for the trip. However, a previous, similar trip may be stored that includes the missed starting location, such as a trip that follows the same route as the new trip, but in the opposite direction. Through a comparison of the data of the new trip to the similar previous trip, missing information of the new trip may be identified and inserted into the new trip data. In another example, location points within the new trip data may be updated or altered based on information included in the previous trip data. Updating trip information may improve the accuracy of the obtained trip data for better processing of telematics or other information associated with a vehicle or trip.

Implementations of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Implementations of the present disclosure may also include aspects of the methods and systems described in co-filed U.S. patent application Ser. No. 17/828,598, filed May 31, 2022, and titled SYSTEM AND METHOD FOR IDENTIFYING TRIP PAIRS, the entirety of which is incorporated by reference herein.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an implementation in the present disclosure can be references to the same implementation or any implementation; and, such references mean at least one of the implementations.

Reference to "one implementation" or "an implementation" means that a particular feature, structure, or characteristic described in connection with the implementation is included in at least one implementation of the disclosure. The appearances of the phrase "in one implementation" in various places in the specification are not necessarily all referring to the same implementation, nor are separate or alternative implementations mutually exclusive of other implementations. Moreover, various features are described which may be exhibited by some implementations and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various implementations given in this specification.

Without intent to limit the scope of the disclosure, examples of instruments, apparatus, methods and their related results according to the implementations of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

I claim:

1. A method for classifying a vehicle trip, the method comprising:
   obtaining, by a classification system, a plurality of geographic location points associated with the vehicle trip, the plurality of geographic location points determined by a location device;
   identifying, from a database of geographic tile identifiers and based on the plurality of geographic location points, a plurality of geographic tile identifiers associated with the vehicle trip, each of the plurality of geographic tile identifiers defining a geographic region;
   deriving, from the plurality of geographic tile identifiers, a fingerprint value for the vehicle trip; and
   assigning, by comparing the fingerprint value for the vehicle trip to a database of fingerprint values of previous trips and to the vehicle trip, an indication of a similarity of the vehicle trip to at least one previous vehicle trip.

2. The method of claim 1 wherein each of the plurality of geographic tile identifiers is associated with at least one longitude value, at least one latitude value, and a tile level value defining a granularity of the geographic region.

3. The method of claim 2, further comprising:
   generating the plurality of geographic tile identifiers; and
   storing the plurality of geographic tile identifiers in the database of geographic tile identifiers.

4. The method of claim 3 wherein generating the plurality of geographic tile identifiers comprises:
   converting the at least one longitude value, the at least one latitude value, and the tile level value to a binary number;
   appending the binary at least one longitude value, the binary of the at least one latitude value, and the binary of the tile level value; and
   converting the appended binary values to a unique identifier value.

5. The method of claim 1 wherein deriving the fingerprint value comprises:
   combining the plurality of geographic tile identifiers into a combined identifier value; and
   executing a hashing technique on the combined identifier value.

6. The method of claim 1 wherein the location device is a Global Positioning System (GPS)-enabled device.

7. The method of claim 1, further comprising:
   inserting, based on information included in a geographic map corresponding to the vehicle trip, at least one geographic location point into the plurality of geographic location points associated with the vehicle trip.

8. The method of claim 1, further comprising:
   executing a similarity distance technique to compare the plurality of geographic tile identifiers associated with the vehicle trip to a list of geographic tile identifiers associated with a second previous trip, and
   comparing an output of the similarity distance technique to a threshold value to determine a similarity of the vehicle trip to the second previous trip.

9. The method of claim 8, further comprising:
   updating the plurality of geographic tile identifiers associated with the vehicle trip with at least one of the list of geographic tile identifiers associated with the second previous trip.

10. The method of claim 8, further comprising:
    updating the geographic location points associated with the vehicle trip based on one or more geographic location points associated with the second previous trip.

11. The method of claim 1 wherein the similarity indicator comprises a classification label associated with the at least one previous vehicle trip.

12. A system for classifying a vehicle trip, the system comprising:
    a communication interface receiving a plurality of geographic location points associated with the vehicle trip, the plurality of geographic location points determined by a location device associated with a vehicle of the vehicle trip;
    a processing device; and
    a non-transitory computer-readable medium encoded with instructions, which when executed by the processing device, cause the processing device to:
    identify, from a database of geographic tile identifiers and based on the plurality of geographic location points, a plurality of geographic tile identifiers associated with the vehicle trip, each of the plurality of geographic tile identifiers defining a geographic region;
    derive, from the plurality of geographic tile identifiers, a fingerprint value for the vehicle trip; and
    assign, by comparing the fingerprint value for the vehicle trip to a database of fingerprint values of previous trips and to the vehicle trip, an indication of a similarity of the vehicle trip to at least one previous vehicle trip.

13. The system of claim 12 wherein the location device is a mobile device associated with a driver of the vehicle.

14. The system of claim 12 wherein the location device is a telematics device associated with the vehicle.

15. The system of claim 12 wherein each of the plurality of geographic tile identifiers is associated with at least one longitude value, at least one latitude value, and a tile level value defining a granularity of the geographic region.

16. The system of claim 15, wherein the instructions, when executed by the processing device, further cause the processing device to:
    generate the plurality of geographic tile identifiers; and
    store the plurality of geographic tile identifiers in the database of geographic tile identifiers.

17. The system of claim 16 wherein causing the processing device to generate the plurality of geographic tile identifiers comprises:
    converting the at least one longitude value, the at least one latitude value, and the tile level value to a binary number;
    appending the binary at least one longitude value, the binary of the at least one latitude value, and the binary of the tile level value; and
    converting the appended binary values to a unique identifier value.

18. The system of claim 12 wherein causing the processing device to derive the fingerprint value comprises:
    combining the plurality of geographic tile identifiers into a combined identifier value; and
    executing a hashing technique on the combined identifier value.

19. A non-transitory, computer-readable medium storing instructions that, when executed by one or more processors, cause the one or more processors to perform the operations of:

obtaining, by a classification system, a plurality of geographic location points associated with a vehicle trip, the plurality of geographic location points determined by a location device;

identifying, from a database of geographic tile identifiers and based on the plurality of geographic location points, a plurality of geographic tile identifiers associated with the vehicle trip, each of the plurality of geographic tile identifiers defining a geographic region;

deriving, from the plurality of geographic tile identifiers, a fingerprint value for the vehicle trip; and assigning, by comparing the fingerprint value for the vehicle trip to a database of fingerprint values of previous trips and to the vehicle trip, an indication of a similarity of the vehicle trip to at least one previous vehicle trip.

20. The non-transitory medium of claim 19 wherein each of the plurality of geographic tile identifiers is associated with at least one longitude value, at least one latitude value, and a tile level value defining a granularity of the geographic region.

21. The non-transitory medium of claim 20, wherein the instructions further cause the one or more processors to perform the operations of:

generating the plurality of geographic tile identifiers; and
storing the plurality of geographic tile identifiers in the database of geographic tile identifiers.

* * * * *